Figure 1:
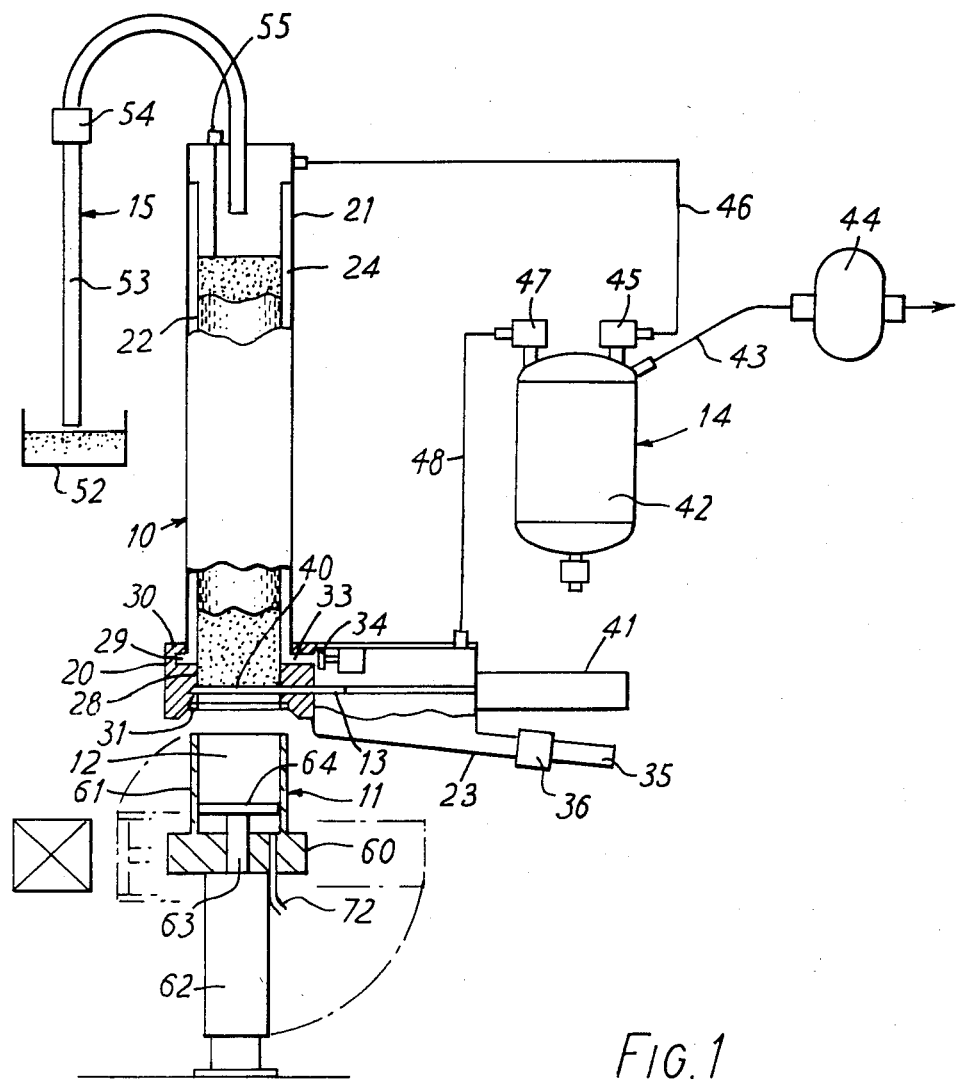

United States Patent [19]

Brockwell et al.

[11] Patent Number: 4,539,902
[45] Date of Patent: Sep. 10, 1985

[54] CHEESE BLOCK FORMER

[75] Inventors: Ian P. Brockwell, Wyckoff, N.J.; Herbert W. Hancock, Merriott, England

[73] Assignee: Alfa-Laval Cheese Systems Limited, Somerset, England

[21] Appl. No.: 525,241

[22] Filed: Aug. 22, 1983

[30] Foreign Application Priority Data

Aug. 24, 1982 [GB] United Kingdom ............... 8224230

[51] Int. Cl.³ ..................... A01J 25/12; A23C 19/00
[52] U.S. Cl. ..................... 99/454; 99/456; 99/460; 425/85; 425/147
[58] Field of Search ............... 99/452–459, 99/460, 461, 465; 100/104, 126; 426/491, 486, 478, 582, 583; 425/85, 147, 308, 444

[56] References Cited

U.S. PATENT DOCUMENTS 4,061,794 12/1977 Charles .................. 99/458 X
4,152,101 5/1979 Charles .................. 99/456 X
4,420,296 12/1983 Anderson ................ 99/452 X Primary Examiner—Timothy F. Simone
Attorney, Agent, or Firm—Davis, Hoxie, Faithfull & Hapgood

[57] ABSTRACT

Cheese curd is fed into the top of a hollow perforated column in a tower at a sub-atmospheric pressure so as to form in the column a pillar of curd supported on a guillotine blade which closes off an opening in the bottom of the tower. A former unit below the tower has an upright open-ended cylinder sealed against the bottom of the tower, and an elevator within the cylinder. The guillotine blade is withdrawn, the pillar of curd lowered into the cylinder by the elevator, and the guillotine blade returned to its closed position so as to cut off a block of curd from the bottom end of the pillar of curd. The elevator is then forced upwards to compress the block of curd within the cylinder. The former unit is subsequently lowered, pivoted into a horizontal position, and the elevator driven along the cylinder to eject the block of curd.

6 Claims, 3 Drawing Figures

CHEESE BLOCK FORMER

This invention relates to cheese-making, and is concerned more particularly with the formation of blocks of compressed natural cheese from cheese curd.

An increasing volume of cheese is being manufactured commercially by cutting cheese curd in a curd mill into small pieces, cubes, slices or chips or by breaking up the curd into granular form by continuous stirring in a vat, mixing the cut or granular curd with salt and any other desired additive to form a mixture which will hereinafter be referred to for convenience as prepared cheese curd, introducing the prepared cheese curd into a perforated tubular column in a chamber under vacuum so as to build up a pillar of curd, the curd in the lower portion of the pillar being compressed by the weight of superimposed curd to press out whey therefrom and consolidate the curd into cheese, and severing blocks of cheese from the bottom of the pillar. Apparatus for forming blocks of cheese in this way are described and illustrated in British Patent Specification Nos. 1,187,964, 1,542,844 and 1,567,894.

The object of the invention is to provide an improved method and apparatus for forming blocks of cheese from prepared cheese curd using a perforated column in a chamber at a sub-atmospheric pressure.

According to the present invention there is provided a method of forming blocks of cheese from prepared cheese curd, comprising feeding the prepared curd into a tubular perforated column so as to build-up a pillar of curd in the column with the curd being fed onto the top of the pillar, the curd in the lower portion of said pillar being compressed by the weight of superimposed curd to press out whey through the perforations in the column and thereby consolidate the curd into cheese, extracting air and whey from said column so as to maintain a sub-atmospheric pressure therein during feeding of the curd into the column whereby at least part of the air introduced into the column with the curd is removed from the curd before the curd is deposited on top of the pillar, lowering the pillar in the column so that the lower end of the pillar projects out of the bottom of the column and into a chamber in a former unit mounted in a receiving position below the column to receive the lower end of the pillar, severing the lower end of the pillar to form a block of cheese supported in said chamber, moving the former unit from said receiving position into a discharge position, and then ejecting the block of cheese from the chamber in the former unit.

The absolute pressure in the column during the build-up of the pillar of curd would depend upon the variety of cheese being made and the closeness of the body of the cheese. By the use of a suitable low pressure within the column almost all the air can be removed from the curd before it is compressed in the pillar, so that the blocks of cheese will be free of air pockets.

The block of cheese is preferably compressed in the chamber in the former unit so as to force the cheese against the walls of the chamber and thereby "square-up" the block to the exact cross sectional dimensions of the chamber. The cross sectional dimensions of the chamber are preferably the same as that of the column to reduce re-shaping of the block to a minimum.

The forcing of the cheese against the walls of the chamber has the additional effect of imparting to the block a surface finish corresponding to that of the walls of the chamber. The walls of the chamber are preferably smooth to provide a smooth surface finish to the block.

According to the invention there is also provided apparatus for forming blocks of cheese from prepared cheese curd according to the method as set out above, comprising a hollow tower having an opening at the bottom thereof, a tubular perforated column in the tower above said opening, guillotine movable between a closed position closing the lower end of the column and an open position in which the lower end of the column is open, a former unit defining an open topped chamber, the former unit being movable between a receiving position in which the former unit closes the opening in the tower with said chamber aligned with the column for reception of curd therefrom and a discharge position in which the top of said chamber is exposed for discharge of a block of cheese from the chamber, vacuum means for creating a sub-atmospheric pressure in the tower and column, means for introducing prepared cheese curd into the upper end of the column to build-up a pillar of curd therein while the tower and column are at sub-atmospheric pressure, means for removing from the tower whey expressed from the lower end of the pillar of curd through the perforations in the column due to the weight of curd superimposed thereon, and an elevator in the chamber operable to lower the pillar of curd in the column when the guillotine is in the open position so that the lower end portion of the pillar extends into the chamber, the guillotine being operable to cut a block of cheese from the lower end of the pillar of curd upon movement of the guillotine into the closed position, and the elevator being operable to eject the block of cheese from the chamber when the former unit is moved into its discharge position.

Figure 2:
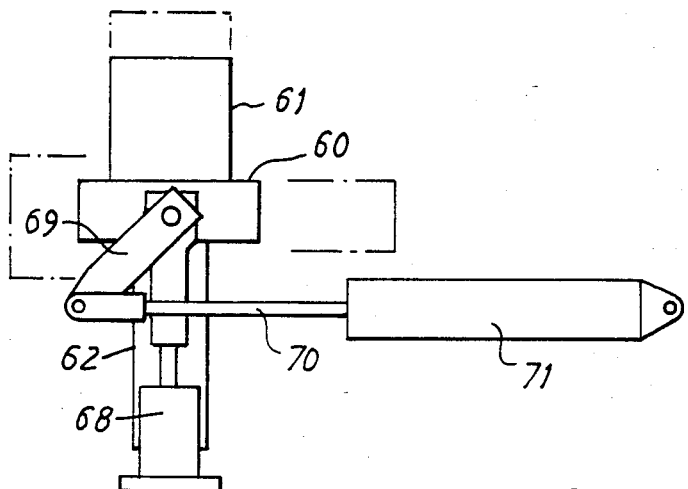
Figure 3:
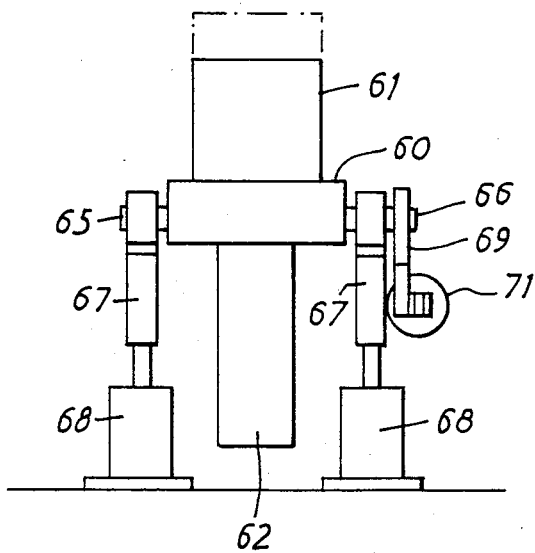

One construction of apparatus suitable for carrying out the method of the invention will now be described, by way of example, with reference to the accompanying drawings, in which:

FIG. 1 is a diagrammatic side elevation showing the tower partially cut away and the former unit partially in section, FIG. 2 is a side elevation of the former unit and its tilting and elevating mechanisms, and FIG. 3 is an end elevation of the former unit and its tilting and elevating mechanisms.

The apparatus comprises a hollow tower 10 open at the lower end thereof, a former unit 11 arranged below the tower and defining an open-topped chamber 12 for reception of curd from the tower, a guillotine 13 mounted on the tower and operable to close off the lower end thereof, a vacuum installation 14 for extracting air and whey from the tower, and a feed device 15 for feeding curd into the top of the tower.

The tower 10 comprises an annular base 20, an external casing 21 mounted in an upright position on the base 20, a tubular column 22 mounted inside the casing 21, and a sump 23 for collecting whey draining from the bottom of the tower. The walls of the column 22 are perforated and co-operate with the external casing 21 to form therebetween a space 24 for drainage of liquid. The column 22 can conveniently consist of perforated liners on the inside wall of the external casing 21. The liners may consist of thin stainless steel sheets, each sheet having small elongated strips punched out of the plane of the sheet to form two narrow slots on each side of each strip with the ends of the strips merging smoothly into the body of the sheet, as described in British Patent Specification No. 1,541,836. The inside surfaces of the walls of the column 22 are then smooth and unobstructed by any inwardly extending projections, and the strips space the body of the sheet from the casing 21 to provide the drainage space 24.

The annular base 20 of the tower has a bore 28 with transverse dimensions equal to the internal transverse dimensions of the column 22. The upper part of the base has a drainage gallery 29 and, above the gallery, a section 30 which has cross sectional dimensions substantially equal to the internal dimensions of the external casing 21. The lower end of casing 21 is sealed in an annular recess (not shown) in the upper end of the surface of the section 30 with the inside surface of the casing 21 flush with the remaining surface of section 30, and the lower end of the tubular column 22 abuts against the lower wall of the gallery with the inside surface of the column flush with the surface of the bore 28 below the gallery. An annular seal 31 surrounds the bottom edge of the bore 28, for a purpose described hereinafter.

The sump 23 comprises a casing mounted on the base of the tower and defining a closed chamber. The sump is arranged to receive whey draining through a duct 33 connected to the gallery 29. The duct 33 is fitted with a solenoid operated isolator valve 34. The bottom of the sump is provided with an outlet 35 fitted with a solenoid operated drain valve 36.

The guillotine 13 comprises a blade 40 mounted in guides in the annular base 20 of the tower, one side of the base 20 having a slot for passage of the blade, the slot opening into the sump 23. A piston and cylinder motor 41 on the casing of the sump is operable to move the blade between a closed position in which it closes off the lower end of the tower, and an open position in which the blade is withdrawn into the sump and wholly clear of the bore 28 in the lower end of the tower.

The vacuum installation 14 comprises a large vacuum reservoir 42 connected directly by a pipe 43 to a vacuum pump 44 operable to maintain the reservoir at a high vacuum. The reservoir is connected through a vacuum distributor valve 45 and a pipe 46 to the upper end of the tower, and through another vacuum distributor valve 47 and a pipe 48 to the sump 23. The two valves 45, 47 are of conventional construction and are operable to connect the associated pipes 46, 48 selectively either to the vacuum reservoir or to atmosphere.

The feed device 15 comprises a hopper 52 for storage of prepared curd, a feed pipe 53 extending between the hopper and the upper end of the tower, and a valve 54 for controlling flow of curd through the pipe 53. The outlet end of the feed pipe 53 is sealed in a central aperture in the top of the tower and arranged to direct curd downwardly into the tower. The upper end of the tower is fitted with a level probe 55 operable to indicate when the curd in the tower is at a predetermined level.

The former unit 11 comprises a trunnion block 60, a cylinder 61 mounted on one side of the block 60, a piston and cylinder motor 62 mounted on the other side of the trunnion block, the motor having a piston rod 63 which extends through a bore in the trunnion block and into the cylinder 61, and an elevator platform 64 mounted on the end of the rod 63 in cylinder 61. The trunnion block is fitted with two stub axles 65, 66 which are pivotally mounted on two pillars 67 for rotation about a substantially horizontal axis. The pillars 67 are mounted on elevator jacks 68. The stub axle 66 is fitted with a crank 69 which is pivotally connected to a piston rod 70 of a piston and cylinder motor 71 pivotally mounted on a fixed support (not shown). The motor 71 is operable through the crank 69 to pivot the former unit consisting of the trunnion block, the cylinder 61 and motor 62 between an upright position shown in full lines in the drawings, and a horizontal discharge position shown in broken lines in FIGS. 1 and 2. The cylinder 61 defines the above mentioned open-topped chamber 12, and has internal transverse dimensions which are substantially the same as those of the bore 28 in the base of the tower. The former unit is arranged so that, when the cylinder 61 is in the upright position, the chamber 12 is axially aligned with the column 22 and the bore 28 in the base of the tower. The two jacks 68 are operable to raise and lower the former unit. The cylinder 61 defining the chamber 12 is thus movable, by an appropriate combination of angular and elevational movements between the said horizontal discharge position and a receiving position in which the cylinder 61 is upright with the open end of the cylinder engaged as a fluid tight fit against the annular seal 31 around the bottom edge of the bore 28 in the base of the tower. The trunnion block is fitted with a pipe 72 which opens into the interior of the cylinder 61, and the pipe 72 is connected through a valve (not shown) with the vacuum reservoir 42 so as to create a sub-atmospheric pressure in the cylinder 61 when the cylinder is sealed against the base of the tower. The motor 62 is operable to drive the rod 63 to move the platform 64 axially along the cylinder 61, the platform 64 acting as an elevator when the cylinder is in the upright receiving position and as an ejector when the cylinder is in the horizontal discharge position.

At the start of an operational cycle of the apparatus, the curd feed pipe 53 is closed by valve 54, the former unit 11 is in its receiving position with the open end of the cylinder 61 engaged against the seal 31 on the base of the tower, the guillotine blade 40 is in the closed position shown in FIG. 1, the outlet 35 of the sump is closed by valve 36, the isolator valve 34 is open, the valves 45, 47 are set so that the pipes 46, 48 are connected to the vacuum reservoir 42, and the vacuum pump 44 is driven to evacuate air from the tower 10, the sump 23 and the interior of the cylinder 61. The hopper is filled with prepared cheese curd.

When a high vacuum is obtained in the tower, the valve 54 is opened so that the difference between the low pressure in the tower and the comparatively high atmospheric pressure acting on the curd in the hopper causes the curd to flow up the pipe 53 and into the top of the tower. The curd entering the tower is of course immediately subjected to the low pressure therein and air and moisture vapour entering with the curd is withdrawn from the tower through the pipe 46.

The cheese curd falls into the column 22 and builds up into a pillar of curd supported on the blade of the guillotine. The weight of curd in the column compresses the curd at the lower end and forces whey out of the curd, the whey passing through the slots in the walls of the column into the space between the column and the external casing and the whey then draining into the gallery 29.

As a result of the continuous induction of air carrying the curd, the tower tends to remain at a slightly higher pressure than the sump 23. Some air is therefore caused to flow continuously downwards between the walls of the column 22 and the external casing 21, into the gallery 29, through the duct 33 and isolator valve 34 into the sump. This flow of air sweeps whey from the slots in the walls of column 22 and carries it into the sump. The drainage slots in the walls of the column are thus kept free from accumulations of moisture and a drying effect is created on these surfaces which assists the exudation of whey from the pillar of curd.

When the pillar of curd has reached a predetermined height indicated by the level probe 55, the valve 54 in the curd feed pipe is closed, the isolator valve 34 in the sump is closed, and the valve 45 on the vacuum reservoir is connected to atmosphere so as to permit air to flow through the pipe 46 into the tower. The resulting increase in pressure in the tower compresses and consolidates the curd in the pillar. Since the build up of the pillar took place at low pressure there is little or no air inside the pillar and any small cavities which may exist are maintained by the slight but declining elasticity of the curd particles. The increased pressure is of course common to the space 24 between the walls of the column and the external casing, and where acting on the vertical faces of the pillar of curd it has the effect of slightly reducing the cross section of the pillar of curd which is thereby eased away from the drainage slots. The section of the pillar of curd in the bore 28 of the base of the tower below the gallery is not subjected to this lateral compression and remains in close contact with the smooth walls of the bore 28 to provide a reasonably airtight seal between the tower and the interior of the cylinder 61 in the former unit.

The elevator platform 64 in the former unit is then raised to a position in which it is immediately below the guillotine blade 40, and the guillotine blade is withdrawn to allow the pillar of curd to drop onto the platform 64. The platform together with the pillar of curd is then lowered slowly by the motor 62 a distance corresponding to the desired depth of a block of cheese, and the guillotine blade driven back into its closed position so as to sever a block of cheese from the lower end of the pillar. During the downward movement of the platform 60 the whole mass of curd is forced downwards against the platform not only by gravity but also by the downward thrust exerted on the pillar by the difference in pressure between the tower which is connected to atmosphere through the pipe 46 and the cylinder 61 which is still connected to the vacuum reservoir.

Although the curd in the block has been compressed by the weight of superimposed curd in the column and by the increased pressure in the tower when connected to atmosphere, the block of curd may be compressed further by forcing the elevator platform 64 upwards and compressing the block against the underside of the guillotine blade 40. The curd, which is in a mallable state, is forced against the walls of the cylinder 61, as well as against the platform and the blade, and this has the effect of "squaring up" the block to the exact cross sectional dimensions of the cylinder 61. The forcing of the cheese against the smooth surfaces of the cylinder walls, the blade and the platform also provides a smoother surface finish to the block of cheese.

After the compression of the cheese block, the pipe 72 is connected to atmosphere to release the vacuum in the cylinder 61, the jacks 68 are operated to lower the former unit together with the block of cheese in the cylinder 61 to the position shown in full lines in the drawings, the motor 71 is operated to turn the former unit through 90° into the discharge position shown in broken lines, and the motor 62 is operated to force the platform 64 outwards of the cylinder 61 and thereby eject the block of cheese onto a conveyor for transport of the block to a packaging station.

The platform 64 is then withdrawn into the cylinder 61, the former unit swung into the upright position and raised into its receiving position with the open end of the cylinder 61 engaged against the seal 31 on the base of the tower, and the cycle repeated to form another block of cheese.

The apparatus may be operated on a continuous basis in which the height of the pillar of curd is maintained substantially constant by adding fresh curd to the top of the pillar everytime a block of cheese has been severed from the bottom of the pillar, or two or more blocks may be severed from the pillar before fresh curd is added to the top of the pillar. Alternatively, the apparatus may be operated on a batch basis in which the entire pillar is severed into blocks of cheese before fresh curd is added to the tower to form another pillar.

The apparatus of the invention may be adapted to form cheese blocks of any desired shape by constructing the column 22 in the tower and the chamber 12 in the cylinder 61 with cross sectional dimensions corresponding to those of the desired block of cheese. For example, the cross section of the column and chamber may be square, rectangular, round or hexagonal to form a cheese block in the corresponding shape. The weight of each cheese block will of course depend on the depth of the block and can be regulated by controlling the distance between the elevator platform and the guillotine blade at the time the block is severed from the pillar.

The initial pillar of curd may if desired be built up on the elevator platform 64 in the former unit instead of on the guillotine blade, and the pillar may be subjected to longitudinal compression, for example by introducing air under pressure into the top of the tower in order to improve consolidation of the curd.

Two or more towers and former units may if desired be mounted in a common frame, so as to produce several blocks of cheese in unison. The curd feed pipe for each tower could then be supplied with curd from a common hopper, and the towers evacuated of air by a common vacuum reservoir.

We claim:

1. Apparatus for forming blocks of cheese from prepared cheese curd, comprising a hollow tower having a bottom formed with an opening therein, a tubular perforated column in the tower above said opening, the tubular column being open at its lower end, a guillotine having a blade movable between a closed position in which the blade closes the lower end of the column and an open position in which the blade is withdrawn from the lower end of the column so as to leave the lower end of the column open, a former unit defining an open topped chamber, means for moving the former unit between a receiving position in which the former unit closes said opening in the bottom of the tower with said chamber aligned with the column for reception of curd therefrom and a discharge position in which the top of said chamber is exposed for discharge of a block of cheese from the chamber, vacuum means for creating a sub-atmospheric pressure in the tower and column, means for introducing prepared cheese curd into the upper end of the column to build-up a pillar of curd therein while the tower and column are at sub-atmospheric pressure, means for removing from the tower whey expressed from the lower end of the pillar of curd through the perforations in the column due to the weight of curd superimposed thereon, and an elevator in the chamber operable to lower the pillar of curd in the column when the guillotine blade is in the open position so that the lower end portion of the pillar extends into the chamber, the guillotine being operable to cut a block of cheese from the lower end of the pillar of curd upon movement of the guillotine blade into the closed position, and the elevator being operable to eject the block of cheese from the chamber when the former unit is moved into its discharge position.

2. Apparatus as claimed in claim 1, wherein the tower comprises an annular base defining a bore and a tubular casing mounted on the base, and the former unit comprises a cylinder open at an end thereof and defining said chamber, the annular base having a bottom thereof adapted to make sealing engagement with the open end of the cylinder when the former unit is in said receiving position.

3. Apparatus as claimed in claim 2, wherein the internal cross sectional dimensions of the lower end of the column, the bore in the annular base of the tower, and the chamber in the former unit are substantially the same.

4. Apparatus as claimed in claim 1, wherein the former unit is pivotally mounted on a frame for angular movement about a substantially horizontal axis, and means are provided for raising the frame so as to raise the former unit into said receiving position with the former unit in sealing engagement with the bottom of the tower.

5. Apparatus as claimed in claim 1, wherein the elevator is operable to compress the block of cheese in the chamber against the guillotine blade in the closed position so as to force the cheese against the walls of the chamber.

6. Apparatus as claimed in claim 1, including means for creating a sub-atmospheric pressure in the chamber in the former unit during lowering of the pillar of curd.

* * * * *